3,492,277
OLEFINE COPOLYMERS CONTAINING POLAR GROUPS AND PROCESS FOR THEIR PREPARATION
Keith Jasper Clark, Welwyn Garden City, England, assignor to Imperial Chemical Industries Limited, London, England, a corporation of Great Britain
No Drawing. Filed Nov. 24, 1967, Ser. No. 685,251
Claims priority, application Great Britain, Jan. 31, 1967, 4,712/67
Int. Cl. C08f *1/56;* B01j *11/84*
U.S. Cl. 260—88.1          5 Claims

ABSTRACT OF THE DISCLOSURE

A method of rendering polar vinyl monomers sufficiently unreactive to allow them to copolymerise with α-olefines without destroying the Zeigler catalysts used, which consists of pretreating the polar monomer with an organo-aluminum compound.

---

This invention relates to a new composition of matter and to its use in the production of polymer material having modified physical and chemical properties.

Crystalline stereoregular polyolefines made by polymerizations conducted in the presence of Zeigler catalysts are now accepted as being useful materials in the manufacture of thermoplastic articles including films and fibres. By a Ziegler catalyst I mean, for the purposes of this specification, a catalyst in which a transition metal compound is present together with a non-transition metal of Groups I, II or III of the Periodic Table or a hydride or organo-metallic compound of such non-transition metal including organo-halides as is for example described in British Patent Nos. 799,392, 810,023 or 877,050.

Polyolefines possess a characteristic inertness which means they are very difficult to surface treat, for example by dyeing or metalising techniques, and also they are limited in the amount of additives such as stabilisers which they can accommodate without "blooming." This inertness may be overcome by incorporating polar groups into the polyolefine material and several methods of doing this are already known, for example by oxidising the polyolefine or by irradiating the polyolefine and then contacting it with an unsaturated polar compound such as maleic anhydride. However, attempts to introduce polar groups into polyolefine by copolymerising α-olefines with α-olefines containing polar groups have been hampered by the reactivity of the polar groups which interact with, and render ineffective one or both components of the Ziegler catalyst.

It is an object of this invention to provide polar monomers in a state capable of being copolymerised with α-olefines and it is also an object to provide a method of copolymerising polar monomers together with α-olefines in the presence of a Ziegler catalyst.

According to the invention there is provided a complex of an organo-aluminium compound with a polar monomer wherein one organo-group of the organo-aluminum compound has been displaced by a polar monomer as hereinbefore defined.

By organo-aluminium compound I mean an aluminium having one of the following formulae, namely (i) $AlR_2R_2R_3$ or (ii) $AlR_1R_2X$ where $R_1$, $R_2$ and $R_3$ are the same or different alkyl or aryl radicals, and X is either chlorine or bromine. It is preferred that the organo-aluminium compound be aluminium diethyl chloride.

This invention further provides a method of polymerising polar monomer with one or more α-olefine monomers comprises polymerising one or more α-olefine monomers in the presence of a Zeigler catalyst and a complex formed by heating together an organo-aluminium compound and the polar monomer.

The product may then be washed with water, an aqueous solution or a non-aqueous system which includes a chelating agent, so that the aluminium complex can be decomposed to liberate the polar group and allow removal of the aluminium residue by conventional washing procedures.

The invention also includes a copolymer material containing copolymerised α-olefine monomers and polar monomers when made according to the method of the invention.

For the purposes of this invention I define a polar monomer to be a substituted α-olefine of the following general formula, namely

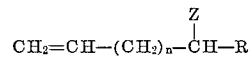

where $n$ is an integer greater than 2, R is hydrogen, an alkyl or aryl radical, and where Z is a polar radical chosen from the groups —NH$_2$, —NHR', —OH, —CN, —COOH, —CONH$_2$, —CONHR', —COOR', —CHO, —COR', —SH, —SO$_3$H or is an aromatic nucleus bearing such groups, and where R' is an alkyl or aryl radical.

The complex is conveniently formed by dissolving the polar momer and the organo-aluminium compound in an inert hydrocarbon solvent in a molar ratio of from 1:1 to 1:3 of polar monomer to organo-aluminium compound, and then heating the solution to between 60° and 150° C. and preferably to at least 100° C. The molar ratios employed vary with the particular polar monomers in use, those containing amino groups often requiring ratios of 1:2 or over. It is believed that during the formation of the complex three kinds of reaction may take place depending upon the structure of the polar monomer. In those cases where the polar radical contains a labile hydrogen as in —NH$_2$, —CO$_2$H or —OH an alkane or arane is formed by the elimination of an alkyl or aryl radical from the aluminium compound, e.g.

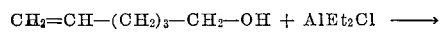
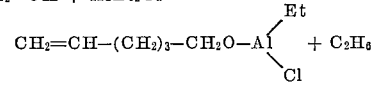

In other instances the aluminium alkyl compound may simply form an addition compound with the polar monomer, e.g.

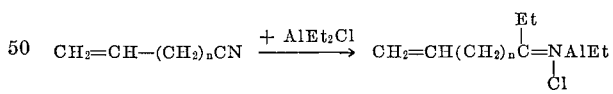

In some cases straight addition is not possible, as observed in some Grignard reactions, and in these cases an alkene is liberated and the Al—H group adds across the polar group e.g.

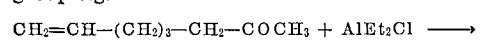
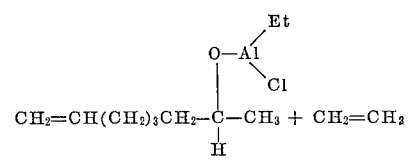

In the latter case the liberated alkene may also take part in the subsequent polymerisation. As a result of this complex formation, the polar group in the polar monomer is sufficiently deactivated to prevent its interaction with the Ziegler catalyst.

Once the complex has been formed, copolymerisation may be commenced by adding the α-olefine monomer and the Ziegler catalyst to the solution of the complex and if necessary heating. In fact it is preferred that the copolymerisation stage be carried out at a temperature of below 100° C. and at a total pressure of atmospheric or slightly above, that is from 1 to 10 atmospheres. It is preferred to copolymerise at temperatures in the region of 60° C. The diluent employed both during copolymerisation and the formation of the complex may be any of the diluents commonly used in Ziegler polymerisations for example n-hexane or cyclohexane, toluene or the various mineral oil fractions such as the one sold under the registered trademark "Sinarol" or the mixture of highly branched paraffins known as "Bayer diluent." The copolymerisation may be carried out as a straight forward random copolymerisation by simply mixing the α-olefine monomers and the complex, or it may be carried out as a block copolymerisation. The olefine monomers used in the various stages of a block copolymerisation need not be the same in every case.

A preferred Ziegler catalyst for use in this invention employs a combination of an organo-aluminium compound, particularly aluminium diethyl chloride and titanium trichloride component which has been prepared by reducing titanium tetrachloride with either hydrogen, aluminium metal, for example, to give the crystalline composition of aluminium, titanium and chloride in the ratio 1 to 3 to 12 as described in British Patent 877,050, or aluminium organo compounds such as aluminium dialkyl chloride, but in particular I choose to use an aluminum alkyl sesquichloride. I prefer that the molar ratio of aluminium diethyl chloride to titanium trichloride be within the range 10:1 to 1:1. All the components of catalysts suitable for use in this invention are highly sensitive to oxygen and water, so care must be taken to exclude these substances from the copolymerisation and this may be done by polymerising under an atmosphere of dry nitrogen.

The choice of polar monomers for use in this invention is governed largely by two considerations, firstly the degree and type of polarity required in the final copolymer, and secondly, the ability of the polar group in the monomer to complex with aluminium alkyl so as to give a substituted 1-olefine capable of polymerisation and in which any interference of the complexed polar group with the double bond to be polymerised has been eliminated. The polar group and the double bond should be separated by a chain of at least 4 carbon atoms (i.e. $n=3$ in the formula given earlier). Any 1-olefine may be used for copolymerisation, e.g. ethylene, propylene, butene-1 and 4-methyl pentene-1.

If necessary the molecular weight distribution of the copolymers formed may be modified by any of the usual techniques such as adding small amounts of hydrogen to the α-olefine monomers, or by carrying out thermal degradation.

The copolymer materials obtained by the methods of this invention can be converted into shaped articles by any of the conventional methods already used in the melt-shaping of polyolefines.

The present invention is illustrated by the following examples.

EXAMPLE 1

Complexes of various polar monomers (as set out in Table I) and aluminium diethyl chloride were made by dissolving various amounts of the polar monomer and aluminium diethyl chloride in 25 mls. of Bayer diluent. (Bayer diluent is a mixture of highly branched paraffins and has a boiling point of between 175° and 183° C.) After an initial exothermic reaction had raised the temperature of the solution to between 60° and 80° C., the solution was heated to 140° C. and maintained at that temperature until the evolution of gas subsided. The entire process was carried out under an atmosphere of nitrogen. In all cases, a volume of gas was evolved commensurate with displacement of one ethyl radical from the aluminium diethyl chloride. The gas evolved was ethane in most cases.

TABLE I

| Polar Monomer | mM. of Polar Monomer added to solution | mM. of AlEt$^2$-Cl added to solution | mM. of gas evolved |
|---|---|---|---|
| Undecylenol | 30 | 30 | 33 |
| Undecylenic acid | 30 | 30 | 36 |
| Undecylenamide | 15 | 35 | 15 |

EXAMPLE 2

A complex was made from 30 mM. of aluminium diethyl chloride and 30 mM. of undecylenic acid by the procedure of Example 1. The solution was allowed to cool to 60° C. and then a further 3 mM. of aluminium diethyl chloride together with 1.5 mM. of TiCl$_3$ were added, still under an atmosphere of nitrogen. Finally 6.6 gms. of 4-methyl pentene-1 were introduced to the vessel containing the solution and a copolymerisation was conducted at 60° C. and a pressure of 1 atmosphere for 20 hours with continuous stirring.

After completing the copolymerisation, the resultant slurry was washed with a mixture of isopropanol and dilute hydrochloric acid both to free the polar substituents from their complexes and also to remove the metallic residues. 6.1 gms. of copolymer were obtained containing 5% of undecylenic acid units (as measured by IR spectroscopy determinations of the >C=O content). The copolymer was found to have a melt flow index of less than 0.1 when measured by the ASTM 1238–57T Test at 260° C. with a 5 kg. weight.

EXAMPLE 3

The procedure of Example 2 was repeated except that 30 mM. of undecylenol were used instead of undecylenic acid, and 16.5 gms. of 4-methyl pentene-1 were added during copolymerisation. 10 gms. of copolymer were obtained containing 8% of undecylenol monomer units (as measured by I.R. spectroscopy). The copolymer had a melt flow index of less than 0.1 when measured by the ASTM 1238–57T Test at a temperature of 260° C., using a 5 kg. weight.

EXAMPLE 4

The procedure of Example 2 was repeated except that 2.7 gms. of undecylenamide were used instead of 30 mM. of undecylenic acid and 5 mls. of 4-methyl pentene-1 added during the copolymerisation. I.R. spectroscopic analysis of the solid product obtained showed the presence of long chain material in the polymer.

EXAMPLE 5

The procedures of Examples 2 and 3 were repeated except that instead of adding 4-methyl pentene-1, a partial pressure of 100 mm. Hg of propylene was maintained throughout the polymerisation. Copolymers were obtained which contained 3% undecylenic acid units and 5% undecylenol.

I claim:
1. A method of polymerizing (a) a polar monomer which is a substituted alpha-olefin of the following formula

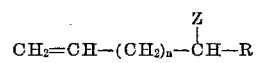

where $n$ is an integer greater than 2, R is hydrogen, an alkyl or aryl radical, and where Z is a polar radical selected from the group consisting of —NH$_2$, —NHR′, —OH, —CN, —COOH, —CONH$_2$, —CONHR′,

—COOR′

—CHO, —COR′, —SH, —SO$_3$H or is an aromatic nucleus bearing such groups, and where R′ is an alkyl or aryl radical, with (b) one or more alpha-olefins selected from the group consisting of ethylene, propylene, butene-1, and 4-methyl-pentene-1, which comprises copolymerizing the monomers in the presence of a Ziegler catalyst and a complex formed by heating together at a temperature of from 60 to 150° C. and under a pressure of from 1 to 10 atmospheres (i) an organo-aluminum compound having the formula $AlR_1R_2R_3$ or $AlR_1R_2X$ where $R_1$, $R_2$, and $R_3$ are the same or different alkyl or aryl radicals, and X is either chlorine or bromine and (ii) said polar monomer, in a ratio of polar monomer to organo-aluminum compound of from 1:1 to 1:3 respectively.

2. A method according to claim 1 in which the copolymer formed is subsequently washed with either
 (a) water,
 (b) an aqueous solution, or
 (c) a non-aqueous solution containing a chelating agent.

3. A method according to claim 1 wherein the Ziegler catalyst includes titanium trichloride which has been prepared by reducing titanium tetrachloride with an aluminium alkyl sesquichloride.

4. A method of claim 1 wherein the Ziegler catalyst used includes a crystalline material containing aluminium, titanium and chlorine in the ratio 1 to 3 to 12.

5. A method according to claim 1 wherein the polar monomer is a derivative of undecylene.

References Cited

UNITED STATES PATENTS

| | | | |
|---|---|---|---|
| 3,062,797 | 11/1962 | Stanek | 260—89.1 |
| 3,069,403 | 12/1962 | Prapas | 260—89.1 |
| 3,082,198 | 3/1963 | Klein | 260—94.9 |
| 3,210,329 | 10/1965 | Jenkins | 260—88.7 |
| 3,287,335 | 11/1966 | Stuetz | 260—86.7 |
| 3,308,108 | 3/1967 | Feldhoff et al. | 260—88.1 |
| 3,442,878 | 5/1969 | Gippin | 260—82.1 |

OTHER REFERENCES

Gaylord and Mark: Linear and Stereoregular Addition Polymers; New York, Interscience Publishers, Inc., 1959, pp. 142–146.

JAMES A. SEIDLECK, Primary Examiner

J. C. HAIGHT, Assistant Examiner

U.S. Cl. X.R.

252—429, 431; 260—63, 79.3, 79.7, 80.73, 80.75, 80.78, 80.8, 80.81, 85.5, 86.7